US012760817B2

(12) United States Patent
Schotland

(10) Patent No.: US 12,760,817 B2
(45) Date of Patent: Oct. 13, 2026

(54) RE-USABLE CONDUIT ASSEMBLY AND STORAGE METHOD

(71) Applicant: Thomas Schotland, Rochester, MN (US)

(72) Inventor: Thomas Schotland, Rochester, MN (US)

( * ) Notice: Subject to any disclaimer, the term of this patent is extended or adjusted under 35 U.S.C. 154(b) by 402 days.

(21) Appl. No.: 18/378,100

(22) Filed: Oct. 9, 2023

(65) Prior Publication Data

US 2025/0116356 A1 Apr. 10, 2025

(51) Int. Cl.
*F16L 11/12* (2006.01)
*A47G 21/18* (2006.01)

(52) U.S. Cl.
CPC ............ *F16L 11/12* (2013.01); *A47G 21/186* (2013.01)

(58) Field of Classification Search
CPC ............................. A47G 21/186; F16L 11/121
See application file for complete search history.

(56) References Cited

U.S. PATENT DOCUMENTS

| | | | |
|---|---|---|---|
| 10,660,464 B2 | 5/2020 | Pepper | |
| 11,160,403 B1 | 11/2021 | Zalace | |
| 11,219,323 B2 | 1/2022 | Reynolds | |
| D954,482 S | 6/2022 | Hong-Lin | |
| 11,375,834 B2 | 7/2022 | Barrett | |
| 2019/0313820 A1* | 10/2019 | Pepper | A47G 21/189 |
| 2020/0229627 A1 | 7/2020 | Wei | |
| 2021/0180299 A1* | 6/2021 | Adir | A45F 3/16 |

FOREIGN PATENT DOCUMENTS

| | | |
|---|---|---|
| CN | 1096953599 | 7/2019 |
| DE | 202018006642 | 11/2021 |
| GB | 2582040 | 9/2020 |

* cited by examiner

*Primary Examiner* — Paul J Gray

(57) ABSTRACT

A conduit assembly includes a tube with a perimeter wall having a first end and a second end. The perimeter wall includes a first living hinge and a second living hinge allowing the tube to be placed in a flattened condition. Once in a flattened condition, the tube can be rolled up for storage. When needed the tube is unrolled such that the tube returns to a shape having a tubular cross-section.

10 Claims, 6 Drawing Sheets

RE-USABLE CONDUIT ASSEMBLY AND STORAGE METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storable conduit devices for transporting fluids and more particularly pertains to a new storable conduit device having a structure allowing for the conduit to be easily flattened and retained in such a condition such that the conduit may be rolled up and thus maintain a small volume of space for storage purposes. In some embodiments, this will encourage a person to carry and re-use the conduit as a drinking straw whereby after use the conduit is cleaned and placed back into storage. Consequently, the present device will reduce waste and consumption of plastics and generally provide a more environmentally friendly straw assembly. Alternatively, other uses may be envisioned such as gardening hoses, medical devices, and other fluid conduit structures where the ability to flatten the conduit allows for ease of deployment, storage, and/or transportation.

(2) Description of Related Art Including Information Disclosed Under 37 CFR 1.97 and 1.98

The prior art relates to storable drinking conduit devices that include the ability to be stored when not in use and re-used as needed. However, these conduits, even in their stored condition, remain too large in volume to encourage long-term storage, transportation and usage.

BRIEF SUMMARY OF THE INVENTION

An embodiment of the disclosure meets the needs presented above by generally comprising a tube that is elongated and defined by a perimeter wall having a first end and a second end. The first end has an opening therein extending through a length of the tube and outwardly through the second end. The tube is comprised of a bendable material. The perimeter wall includes a first living hinge and a second living hinge each being elongated and extending from the first end to the second end. The first living hinge is positioned opposite of the second living hinge. The first and second living hinges facilitate bending of the perimeter wall along the first and second living hinges. A cross-section of the tube taken perpendicular to a longitudinal axis extending through the first and second ends forms a tubular shape when the first and second living hinges are in a relaxed state. The first and second living hinges divide the perimeter wall into a first wall section and a second wall section positioned opposite of each other, and which are collapsible against each other when the first and second living hinges are biased against the relaxed state such that the tube is placed in a flattened state. The first end of the tube is rollable toward the second end when the tube is in the flattened state to form a flat spiral and define a stored condition. The tube is unrolled and the first and second flat hinges returned to a relaxed state to define a deployed condition.

Another embodiment of the disclosure includes a method of storing a conduit including the step of flattening a tube. The tube is elongated and defined by a perimeter wall extending from a first end to a second end of the perimeter wall. The first end has an opening therein extending through a length of the tube and outwardly through the second end. The tube is comprised of a bendable material. The perimeter wall includes a first living hinge and a second living hinge each being elongated and extending from the first end to the second end. The first living hinge is positioned opposite of the second living hinge. The first and second living hinges facilitate bending of the perimeter wall along the first and second living hinges. A cross-section of the tube taken perpendicular to a longitudinal axis extending through the first and second ends forms a tubular shape when the first and second living hinges are in a relaxed state. The first and second living hinges divide the perimeter wall into a first wall section and a second wall section positioned opposite of each other. The first and second wall sections are collapsible against each other when the first and second living hinges are biased against the relaxed state such that the tube is placed in the flattened state to facilitate rolling of the tube from the first end to the second end. The first and second flat hinges are returnable to a relaxed state to define a deployed condition. The tube is rolled in its flattened state from the first end thereof to the second end thereof to form a flat spiral defining a stored condition. The flat spiral is then placed in a storage container having a size and shape to receive the tube in the stored condition.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figures 1, 2:
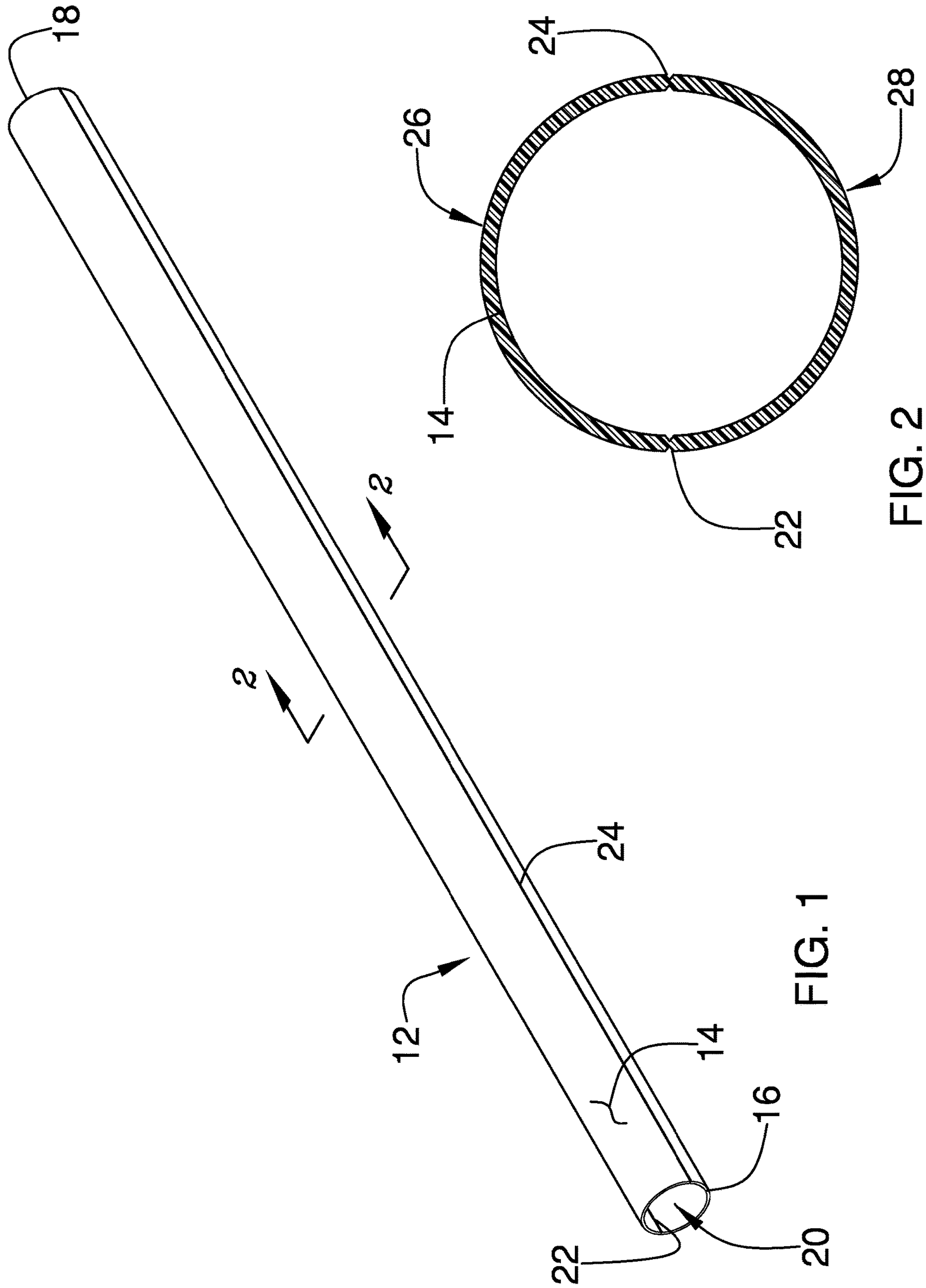
FIG. 1 is a side perspective view of a re-usable conduit assembly and storage method according to an embodiment of the disclosure.
FIG. 2 is a cross-sectional view of an embodiment of the disclosure taken along line 2-2 of FIG. 1.

With reference now to the drawings, and in particular to FIGS. 1 through 8 thereof, a new storable conduit device embodying the principles and concepts of an embodiment of the disclosure and generally designated by the reference numeral 10 will be described.

As best illustrated in FIGS. 1 through 8, the re-usable conduit assembly 10 and storage method generally comprises a tube 12 that is elongated and defined by a perimeter wall 14 having a first end 16 and a second end 18. The first end 16 has an opening 20 therein extending through a length of the tube 12 and outwardly through the second end 18. The tube 12 is comprised of a bendable material and typically will comprise a resiliently bendable material being capable of returning to its original shape. The bendable material will most typically be a plastic material, though any bendable material, suitable for use as a drinking straw, may be utilized. When the conduit assembly 10 is utilized for usage other than as a drinking straw, various other materials may be employed conventional to those uses. Though variations are possible, the tube 12 when used as a drinking straw most typically will have a length from the first end 16 to the second end 18 between 15.0 cm and 30.0 cm, an interior diameter between 0.4 cm and 1.25 cm, and an outer diameter that is less than 0.1 cm greater than the interior diameter. Those in the art will appreciate that these sizes may vary greatly when the tube 12 is utilized in other ways, such as, for example, a garden hose wherein the tube 12 will have a length of several meters and an interior diameter of greater than 2 cm.

The perimeter wall 14 includes a first living hinge 22 and a second living hinge 24. The first 22 and second 24 living hinges are each elongated and extends from the first end 16 to the second end 18. Often the first 22 and second 24 living hinges will be comprised of a material which is more resiliently stretchable than remaining portions of the perimeter wall 14. In some embodiments the first 22 and second 24 living hinges will be formed in the perimeter wall 14 itself and be comprised of the same material as the perimeter wall 14. In some embodiments the first 22 and second 24 living hinges may form a unitary structure with the remaining portions of the tube 12 such that the tube 12, from the first end 14 to the second end 16, is impervious to fluid leakage. However, as indicated above, the first 22 and second 24 living hinges may be comprised of a different material than a remainder of the perimeter wall 14.

The first living hinge 22 is positioned opposite of the second living hinge 24, and the first 22 and second 24 living hinges facilitate bending of the perimeter wall 14 along the first 22 and second 24 living hinges. A cross-section of the tube 12 taken perpendicular to a longitudinal axis extending through the first 16 and second 18 ends will most often form a tubular shape, which is often a rounded shape, when the first 22 and second 24 living hinges are in a relaxed state as shown in FIG. 2. The term "relaxed state" may include the first 22 and second 24 living hinges biasing the tube 12 into a tubular shape such that it may be utilized as a drinking conduit. The "rounded shape" may be a circle but often the shape may instead form an ellipse or other, similar arcuate shape. However, any geometric shape allowing for a tubular configuration may be utilized and may be dependent upon the number of living hinges employed. For example, should the assembly 10 instead include more than two living hinges, such as four living hinges, the shape could be rectangular.

Figure 3:
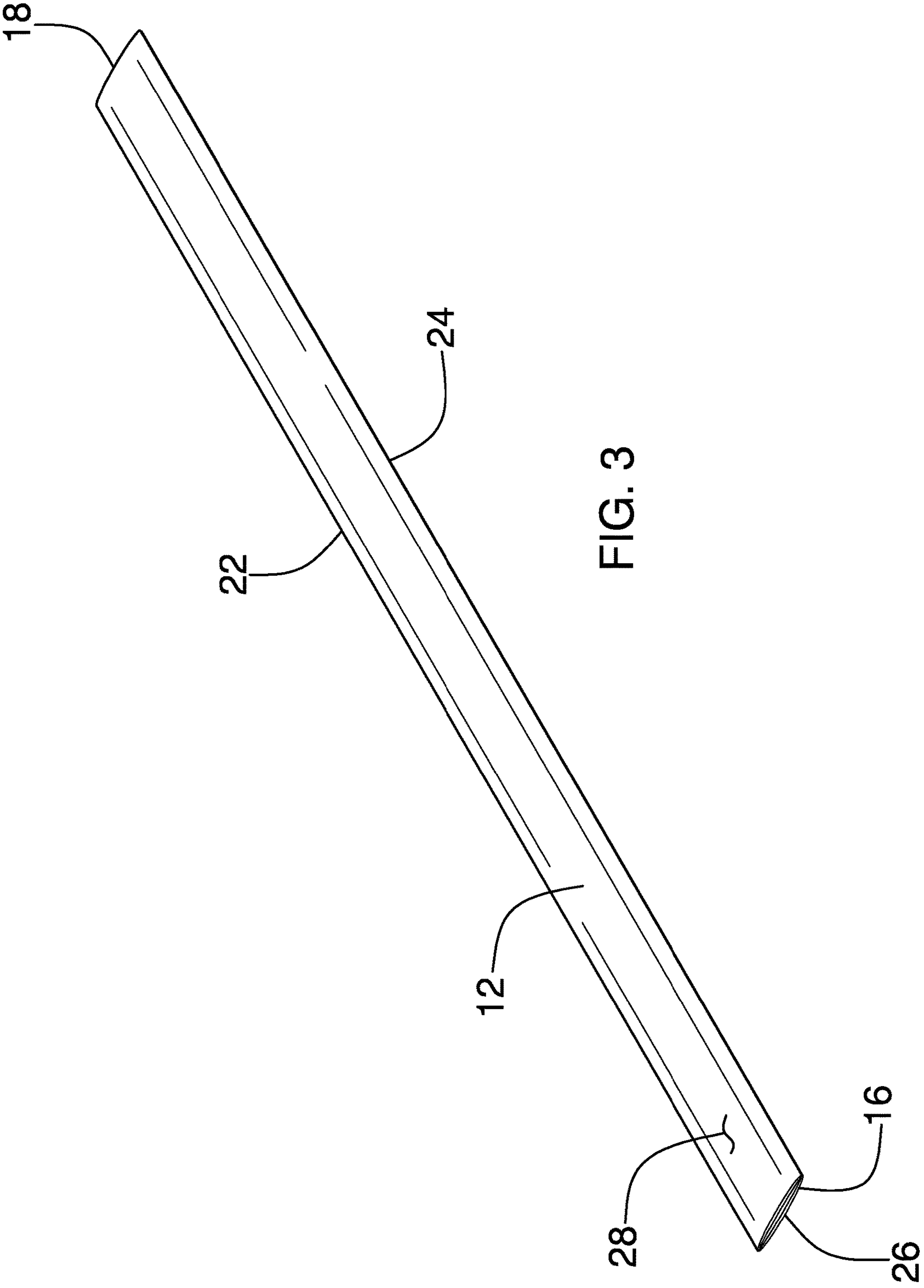
FIG. 3 is a side perspective view of an embodiment of the disclosure.

The first 22 and second 24 living hinges divide the perimeter wall 14 into a first wall section 26 and a second wall section 28 that are positioned opposite of each other. The first 26 and second 28 wall sections are collapsible against each other, owing to the nature of the bendable material of the tube 12, when the first 22 and second 24 living hinges are biased against the relaxed state. Thus, the tube 12 is placeable in a flattened state as shown in FIG. 3. It is noted that the flattened state may not be completely "flat" with each of the first 26 and second 28 wall sections being planar, but the first 26 and second 28 wall sections will approach a planar shape and, regardless, will be abutting each other at various points along their shared lengths.

The first end 16 of the tube 12 is rollable toward the second end 18 when the tube 12 is in the flattened state to form a flat spiral. When in the flat spiral, shown in FIG. 6, a stored condition of the tube 12 is defined. The tube 12 may be unrolled and the first 26 and second 28 flat hinges returned to a relaxed state to define a deployed condition as shown in FIG. 1. It should be understood that once the tube 12 is in the flattened state, the living hinges may be structured to releasably retain the tube in the flattened state. Additionally, a more complex living hinge may be utilized that will retain both of the deployed and flattened states requiring the user to manipulate the tube 12 between the two states. Should the living hinges have breaks therein, the tube 12, before the tube 12 is rolled, may be folded upon itself one or more times at fold points defined between the first end 26 and the second end 28. Furthermore, depending on the diameter of the tube 12, it may also be folded along its length from the first end 26 to the second end 28.

Figures 4, 5:
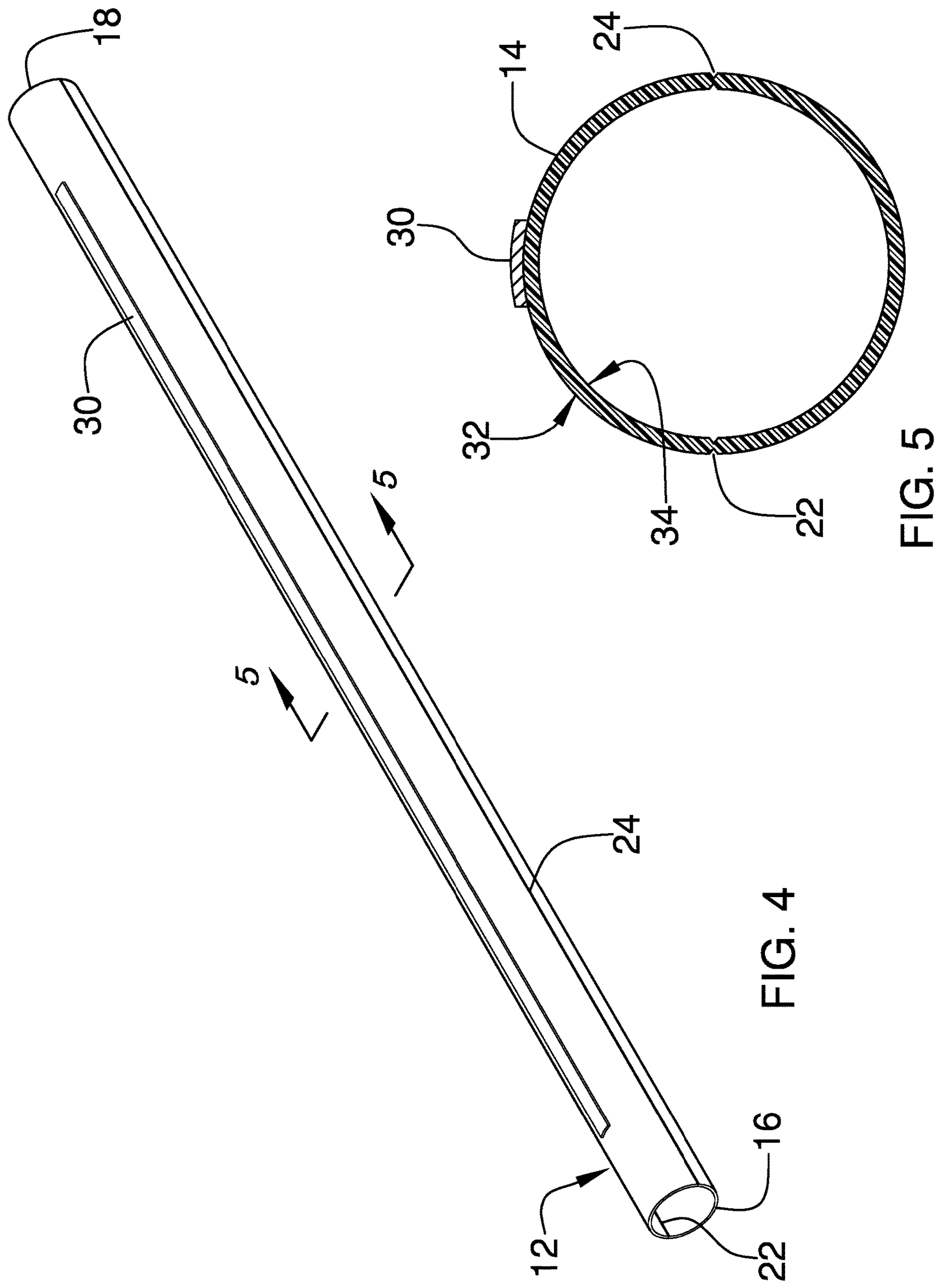
FIG. 4 is a side perspective view of an embodiment of the disclosure.
FIG. 5 is a cross-sectional view of an embodiment of the disclosure taken along line 5-5 of FIG. 4.
Figure 6:
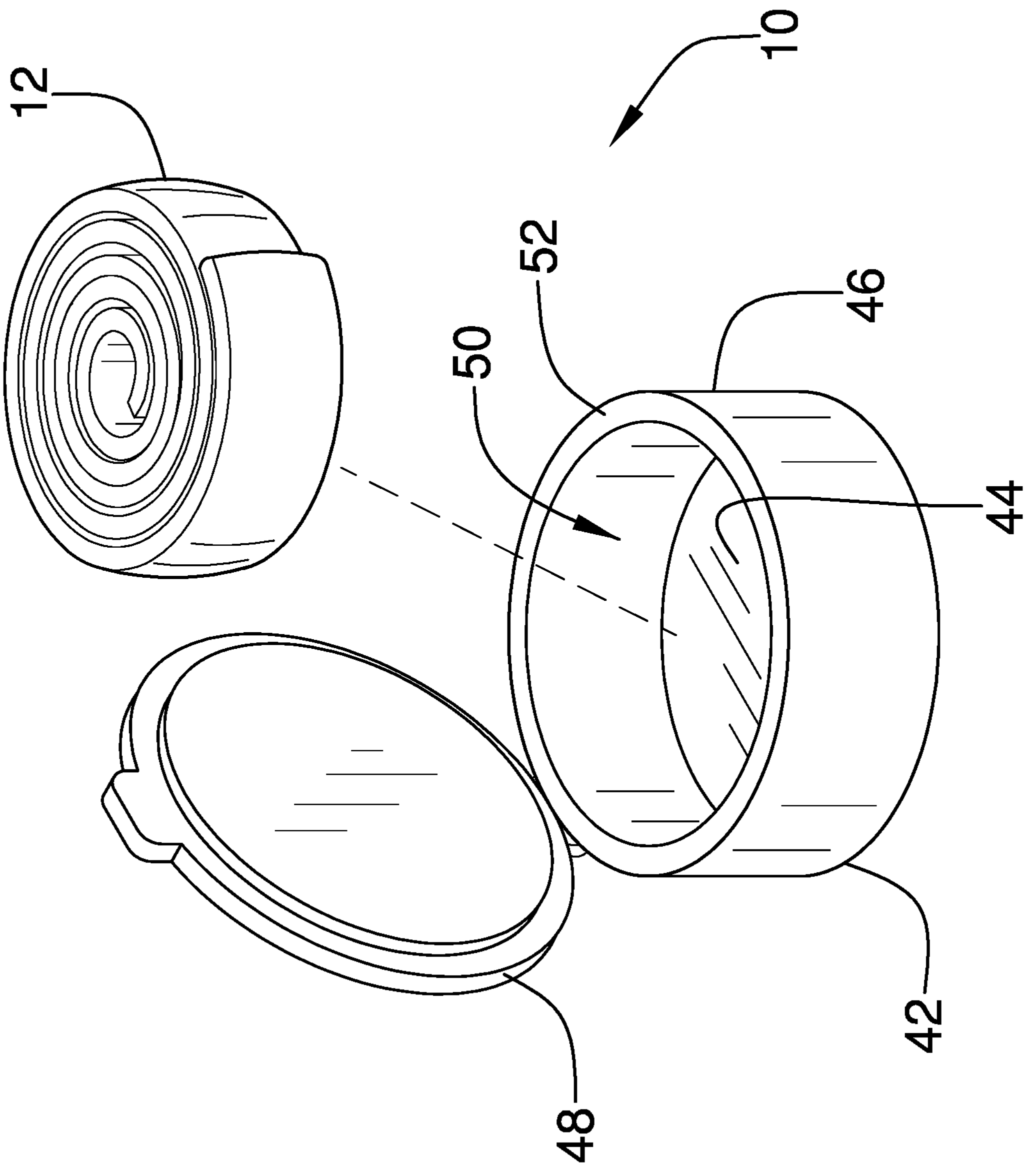
FIG. 6 is a top perspective view of an embodiment of the disclosure.
Figure 7:
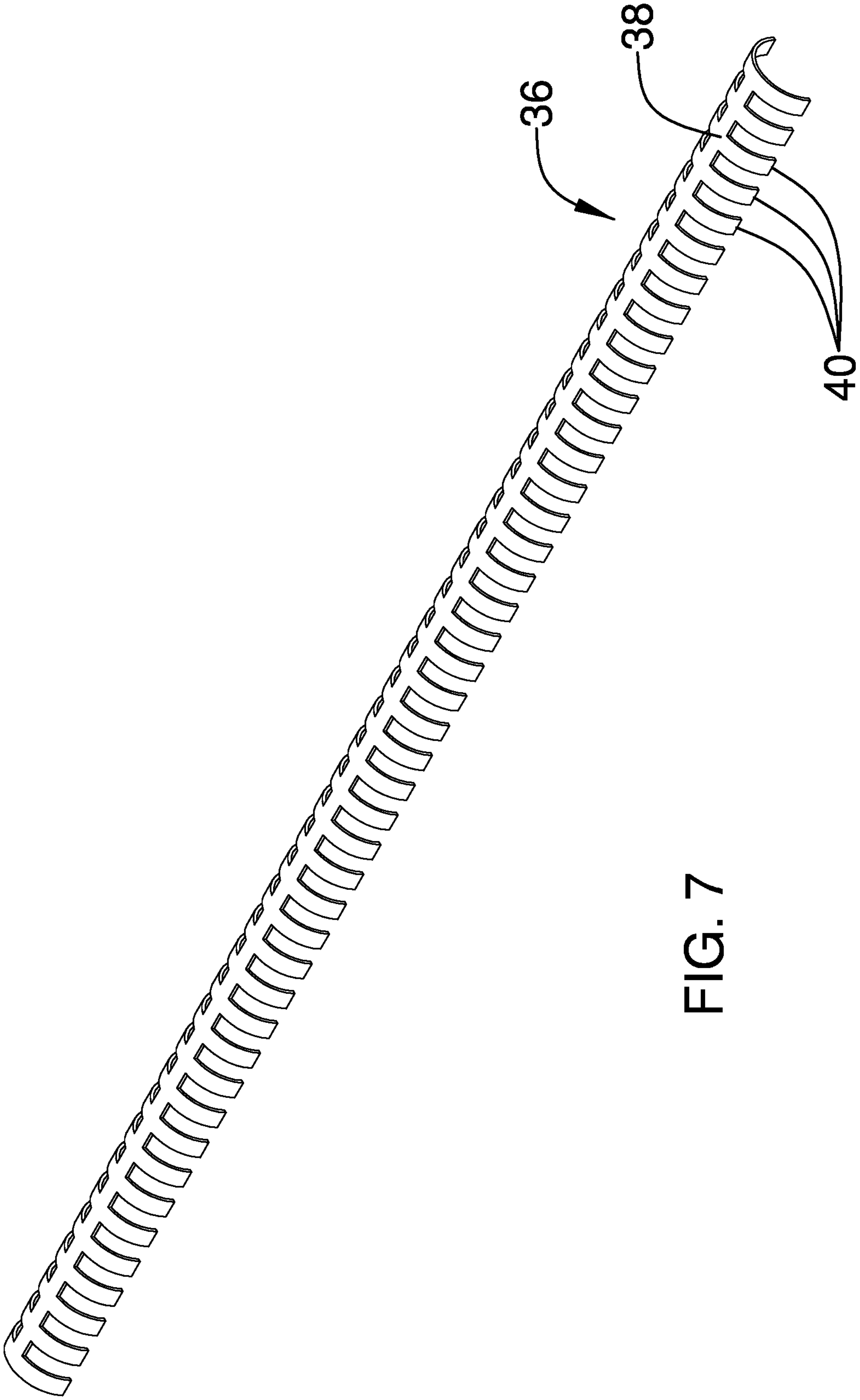
FIG. 7 is a side perspective view of an embodiment of a spine of the disclosure.
Figure 8:
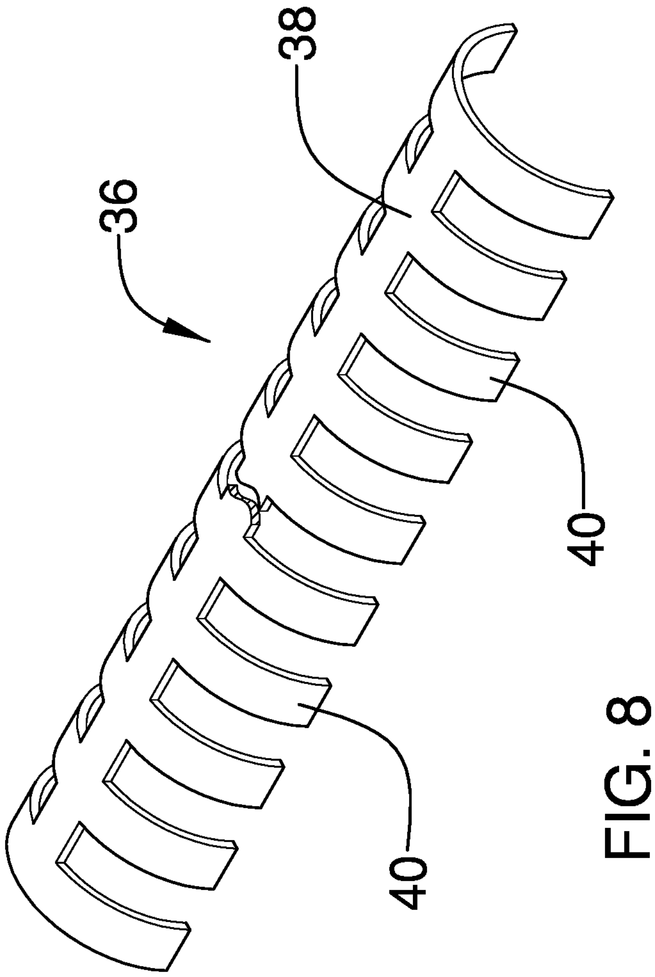
FIG. 8 is an enlarged broken view of the embodiment of the spine shown in FIG. 7 of the disclosure.

Because of the nature of some of the materials that may be utilized for the tube 12, a condition may exist whereby the material of the tube 12 retains the memory of its shape when in the stored condition. That is, the tube 12 may not easily unroll to the deployed condition. To help ensure unrolling of the tube 12, a spine 30 may be added to the tube 12 which will bias the tube 12 against being retained in the flat spiral when force, holding the tube 12 in the flat spiral position, is removed. The spine 30 will usually be spaced from the first 26 and second 28 living hinges and will be elongated. The spine 30 may be comprised of memory materials, including plastics, carbon fibers, and metals, which will return to their original shape. FIGS. 4 and 5 show one spine 30 of elongated material attached to the tube 12. Though this spine 30 is attached to an outer surface 32 of the perimeter wall 12, it may be positioned on an interior surface 34 of the perimeter wall 12, or between the interior 34 and exterior 32 surfaces of the perimeter wall 12. The spine 30 may furthermore be positioned in a pocket within or on the perimeter wall which allows some movement of the spine 30 when the tube 12 is being rolled. Another embodiment of the spine 36, shown in FIGS. 7 and 8, includes a central support 38 with a plurality of ribs 40 which may also be used to facilitate the movement of the tube 12 toward the tubular shape. Again, this spine 36 may be positioned on a surface of the tube 12 or between its exterior 32 and interior 34 surfaces. It should be understood that the spine 30 may also include a plurality of spines 30, such as two spines 30 diametrically opposed to each other, as well as multiple spines 30 of shorter lengths.

Though not shown, an alternative structure for unrolling of the tube 12 would include the first 22 and second 24 living hinges, instead of a being a conventional flat or straight living hinge, comprising a butterfly or other monostable or bi-stable living hinge having the ability to bias towards or against the flat spiral, or the flattened form of the tube 12, or both.

A storage container 42 is provided having a size and shape to receive the tube 12 in the stored condition. The storage container 42 in the embodiment of FIG. 6 includes a bottom wall 44, a peripheral wall 46 attached to the bottom wall 44, and a lid 48 which is closable over an access opening 50 defined by an upper edge 52 of the peripheral wall 46. The bottom wall 44 may have a circular shape such that the peripheral wall 46 is cylindrical. When the tube 12 is to be used as a drinking straw, the storage container 42 will typically have a size of less than 120 $cm^3$ and more often no more than 25 $cm^3$ such that it can be conveniently stored such as within a purse or on a keychain. Thus, in some embodiments, the storage container will have a size of between 5 $cm^3$ and 10 $cm^3$.

In use, the tube 12 will be utilized as a conventional conduit for the transfer of fluids and thus may be used as a drinking conduit. However, when not in use, it may be rolled up and stored within the container 42. When the user wishes to use the assembly 10, the tube 12 is removed from the container 42 and unrolled for use. When the user no longer requires a drinking straw, the tube 12 is cleaned, flattened, and rolled up for storage in the container 42 until needed again.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the element.

I claim:

1. A stowable conduit assembly comprising:

a tube being elongated and defined by a perimeter wall having a first end and a second end, the first end having an opening therein extending through a length of the tube and outwardly through the second end, the tube being comprised of a bendable material;

the perimeter wall including a first living hinge and a second living hinge, the first and second living hinges each being elongated and extending from the first end to the second end, the first living hinge being positioned opposite of the second living hinge, the first and second living hinges facilitating bending of the perimeter wall along the first and second living hinges, a cross-section of the tube taken perpendicular to a longitudinal axis extending through the first and second ends forming a tubular shape when the first and second living hinges are in a relaxed state, the first and second living hinges dividing the perimeter wall into a first wall section and a second wall section being positioned opposite of each other, the first and second wall sections being collapsible against each other when the first and second living hinges are biased against the relaxed state such that the tube is placed in a flattened state, an interior surface of the first wall section and an interior surface of the second wall section each being smoothly curved between the first living hinge and the second living hinge in the relaxed state and planar between the first living hinge and the second living hinge in the flattened state; and the first end of the tube being rollable toward the second end when the tube is in the flattened state to form a flat spiral and define a stored condition, the tube being unrolled and the first and second living hinges returned to a relaxed state to define a deployed condition.

2. The stowable conduit assembly according to claim 1, wherein the bendable material is a plastic material.

3. The stowable conduit assembly according to claim 2, wherein the tube has a length from the first end to the second end between 15.0 cm and 30.0 cm.

4. The stowable conduit assembly according to claim 3, wherein the tube has an interior diameter between 0.4 cm and 1.25 cm, the tube having an outer diameter being less than 0.1 cm greater than the interior diameter.

5. The stowable conduit assembly according to claim 4, further including a storage container having a size and shape to receive the tube in the stored condition.

6. The stowable conduit assembly according to claim 1, further including a storage container having a size and shape to receive the tube in the stored condition.

7. The stowable conduit assembly according to claim 1, further including a spine being attached to the conduit and being spaced from the first and second living hinges, the spine being elongated and biasing the tube against being retained in the flat spiral.

8. The stowable conduit assembly according to claim 6, further including a spine being attached to the conduit and being spaced from the first and second living hinges, the spine being elongated and biasing the tube against being retained in the flat spiral.

9. A stowable conduit assembly comprising:

a tube being elongated and defined by a perimeter wall having a first end and a second end, the first end having an opening therein extending through a length of the tube and outwardly through the second end, the tube being comprised of a bendable material;

the perimeter wall including a first living hinge and a second living hinge, the first and second living hinges each being elongated and extending from the first end to the second end, the first living hinge being positioned opposite of the second living hinge, the first and second living hinges facilitating bending of the perimeter wall along the first and second living hinges, a cross-section of the tube taken perpendicular to a longitudinal axis extending through the first and second ends forming a tubular shape when the first and second living hinges are in a relaxed state, the first and second living hinges dividing the perimeter wall into a first wall section and a second wall section being positioned opposite of each other, the first and second wall sections being collapsible against each other when the first and second living hinges are biased against the relaxed state such that the tube is placed in a flattened state;

the first end of the tube being rollable toward the second end when the tube is in the flattened state to form a flat spiral and define a stored condition, the tube being unrolled and the first and second living hinges returned to a relaxed state to define a deployed condition; and wherein the first and second living hinges retain the tube in the flattened state when the tube is placed in the flattened state.

10. A method of stowing a conduit between usages thereof, the method including the steps of:

flattening a tube, the tube being elongated and defined by a perimeter wall extending from a first end to a second end of the perimeter wall, the first end having an opening therein extending through a length of the tube and outwardly through the second end, the tube being comprised of a bendable material, the perimeter wall including a first living hinge and a second living hinge, the first and second living hinges each being elongated and extending from the first end to the second end, the first living hinge being positioned opposite of the second living hinge, the first and second living hinges facilitating bending of the perimeter wall along the first and second living hinges, a cross-section of the tube taken perpendicular to a longitudinal axis extending through the first and second ends forming a tubular shape when the first and second living hinges are in a relaxed state, the first and second living hinges dividing the perimeter wall into a first wall section and a second wall section being positioned opposite of each other, the first and second wall sections being collapsible against each other when the first and second living hinges are biased against the relaxed state such that the tube is placed in a flattened state to facilitate rolling of the tube from the first end to the second end, wherein the first and second living hinges are returnable to a relaxed state to define a deployed condition;

rolling the tube in its flattened state from the first end thereof to the second end thereof to form a flat spiral defining a stored condition; and positioning the flat spiral in a storage container having a size and shape to receive the tube in the stored condition.

* * * * *